United States Patent
Martin et al.

(10) Patent No.: US 10,979,985 B2
(45) Date of Patent: Apr. 13, 2021

(54) TERMINAL AND RELAY DEVICES, BASE STATION AND METHODS

(71) Applicant: Convida Wireless, LLC, Wilmington, DE (US)

(72) Inventors: Brian Alexander Martin, Basingstoke (GB); Shin Horng Wong, Basingstoke (GB); Martin Warwick Beale, Basingstoke (GB); Hiromasa Uchiyama, Basingstoke (GB); Hideji Wakabayashi, Basingstoke (GB); Shinichiro Tsuda, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/499,326

(22) PCT Filed: Mar. 1, 2018

(86) PCT No.: PCT/EP2018/055089
§ 371 (c)(1),
(2) Date: Sep. 30, 2019

(87) PCT Pub. No.: WO2018/177678
PCT Pub. Date: Oct. 4, 2018

(65) Prior Publication Data
US 2020/0068510 A1 Feb. 27, 2020

(30) Foreign Application Priority Data
Mar. 31, 2017 (EP) .................................... 17164263

(51) Int. Cl.
*H04W 52/10* (2009.01)
*H04W 52/36* (2009.01)
(Continued)

(52) U.S. Cl.
CPC ....... *H04W 52/367* (2013.01); *H04W 52/146* (2013.01); *H04W 52/242* (2013.01);
(Continued)

(58) Field of Classification Search
CPC ............. H04W 52/367; H04W 52/146; H04W 52/242; H04W 52/243; H04W 52/283; H04W 52/383; H04W 88/04; H04W 52/10
(Continued)

(56) References Cited

U.S. PATENT DOCUMENTS 9,491,766 B2 * 11/2016 Peng .................... H04W 72/048
9,853,709 B2 * 12/2017 Ryu .................... H04W 64/006
(Continued)

FOREIGN PATENT DOCUMENTS

WO 2012/075630 A1 6/2012
WO 2014/046579 A1 3/2014

OTHER PUBLICATIONS

International Search Report and Written Opinion dated May 29, 2018 for PCT/EP2018/055089 filed on Mar. 1, 2018, 11 pages.
(Continued)

*Primary Examiner* — Hai V Nguyen
(74) *Attorney, Agent, or Firm* — BakerHostetler (57) ABSTRACT

A relay device configured to communicate with a terminal device of the network and with a base station of the network. The relay device comprises transmitter circuitry, receiver circuitry and controller circuitry. The controller circuitry is configured in combination with at least the transmitter circuitry: to select a maximum transmission power to be used by the terminal device for communicating with the relay device, wherein the identified maximum transmission power is based on link information relating to one or both of the link between the relay device and the base station and the
(Continued)

link between the relay device and the terminal; to notify the communication device of the selected maximum transmission power for the terminal to select an actual transmission power and to transmit signals to the relay device at a power that is no more than the maximum transmission power.

16 Claims, 5 Drawing Sheets

(51) Int. Cl.
| | |
|---|---|
| *H04W 52/14* | (2009.01) |
| *H04W 52/24* | (2009.01) |
| *H04W 52/28* | (2009.01) |
| *H04W 52/38* | (2009.01) |
| *H04W 88/04* | (2009.01) |

(52) U.S. Cl.
CPC ....... *H04W 52/243* (2013.01); *H04W 52/283* (2013.01); *H04W 52/383* (2013.01); *H04W 88/04* (2013.01); *H04W 52/10* (2013.01)

(58) Field of Classification Search
USPC .................................................. 455/522, 69
See application file for complete search history.

(56) References Cited

U.S. PATENT DOCUMENTS

| | | | | |
|---|---|---|---|---|
| 10,075,863 | B2* | 9/2018 | Delsol | H04W 36/30 |
| 10,129,836 | B2* | 11/2018 | Prytz | H04W 76/14 |
| 10,177,834 | B2* | 1/2019 | Basu Mallick | H04W 52/0229 |
| 10,298,314 | B2* | 5/2019 | Ryu | H04W 64/006 |
| 10,382,989 | B2* | 8/2019 | Lee | H04W 76/14 |
| 10,405,229 | B2* | 9/2019 | Kim | H04W 4/80 |
| 10,498,431 | B2* | 12/2019 | Basu Mallick | H04W 52/0229 |
| 2010/0034135 | A1* | 2/2010 | Kim | H04W 72/0446 370/315 |
| 2011/0128893 | A1* | 6/2011 | Park | H04W 74/0866 370/279 |
| 2012/0307700 | A1* | 12/2012 | Nordberg | H04W 52/0254 370/311 |
| 2012/0327794 | A1* | 12/2012 | Han | H04W 52/143 370/252 |
| 2013/0322287 | A1* | 12/2013 | Bontu | H04W 24/08 370/252 |
| 2014/0146750 | A1* | 5/2014 | Kim | H04W 52/244 370/328 |
| 2017/0317740 | A1* | 11/2017 | Basu Mallick | H04B 7/15557 |
| 2018/0049260 | A1* | 2/2018 | Aminaka | H04W 72/048 |
| 2018/0076878 | A1* | 3/2018 | Ryu | H04B 7/15507 |
| 2018/0139794 | A1* | 5/2018 | Chae | H04W 56/00 |
| 2018/0176805 | A1* | 6/2018 | Lee | H04W 92/18 |
| 2019/0109631 | A1* | 4/2019 | Basu Mallick | H04B 7/15557 |
| 2019/0268964 | A1* | 8/2019 | Lee | H04W 76/27 |
| 2020/0052774 | A1* | 2/2020 | Basu Mallick | H04B 7/15557 |
| 2020/0068532 | A1* | 2/2020 | Bengtsson | H04W 72/042 |

OTHER PUBLICATIONS

Huawei et al., "Discussion on low power consumption", 3GPP TSG RAN1 Meeting No. 88b, R1-1704305, Spokane, USA, Apr. 3-7, 2017, 3 pages.

Qualcomm, "Motivation for SI proposal on Further Enhancements to LTE Device to Device", RP-160268, Agenda: 10.1.2, pp. 1-10.

ZTE, "Motivation for new Work Item on D2D communication for commercial use cases", 3GPP TSG RAN Meeting #71 RP-160283, Goteborg, Sweden, Mar. 7-10, 2016, 8 pages.

LG Electronics, Motivation for New SI, "Enhancements of relayed Connection via WLAN and LTE Sidelink (ECO)", RP-160241, pp. 1-5.

China Telecom, "Discussion on UE Relay for eMBB and IoT", 3GPP TSG RAN Meeting No. 71 RP-160247, Goteborg, Sweden, Mar. 7-10, 2016, pp. 1-6.

Qualcomm Incorporated, "New Work Item: NarrowBand IOT (NB-IOT)", 3GPP TSG RAN Meeting No. 69, RP-151621, Phoenix, USA, Sep. 14-16, 2015, 8 pages.

Huawei et al., "L2 UE-to-Network Relay for E-UTRAN", 3GPP TSG-RAN #71 RP-160415, Göteborg, Sweden, Mar. 7-10, 2016, pp. 1-4.

Qualcomm Incorporated et al., "New SI: Further Enhancements LTE Device to Device, UE to Network Relays for Wearables", 3GPP TSG RAN Meeting No. 71, RP-160677, Gothenburg, Sweden, Mar. 7-10, 2016, 7 pages.

Huawei et al., "Revised SI: Further Enhancements LTE Device to Device, UE to Network Relays for IoT and Wearables", 3GPP TSG RAN Meeting No. 73, RP-161839 revision of RP-161802, New Orleans, Sep. 19-22, 2016, 8 pages.

Interdigital et al., "Relay selection criteria", 3GPP TSG-SA WG1 Meeting No. 77 S1-171438 (revision of S1-170190, 1062, 1241), Jeju Island, South Korea, Feb. 13-17, 2017, 2 pages.

Interdigital et al., "Relay selection criteria", 3GPP TSG-SA WG1 Meeting No. 77 S1-171439 (revision of S1-171063), Jeju Island, South Korea, Feb. 13-17, 2017, 2 pages.

3GPP, LTE; Evolved Universal Terrestrial Radio Access (E-UTRA); Radio Resource Control (RRC); Protocol Specification, 3GPP TS 36.331 version 13.0.0 Release 13, Jan. 2016, pp. 1-669.

Intel, "Motivation for SI: Further LTE D2D Enhancements for Wearables and MTC", 3GPP TSG RAN Meeting No. 71 RP-160427, Göteborg, Sweden, Mar. 7-10, 2016, pp. 1-13.

Harri Holma, et al., "LTE for UMTS: OFDMA and SC-FDMA Based Radio Access", Wiley 2009, ISBN 978-0-470-99401-6, 8pp.

* cited by examiner

TERMINAL AND RELAY DEVICES, BASE STATION AND METHODS

CROSS-REFERENCE TO RELATED APPLICATIONS

The present application is based on PCT filing PCT/EP2018/055089, filed Mar. 1, 2018, which claims priority to EP 17164263.0, filed Mar. 31, 2017, the entire contents of each are incorporated herein by reference.

BACKGROUND

Field of Disclosure

The present disclosure relates to relay devices which are configured to relay signals between terminal devices and a base station in a mobile communications network. The present application claims the Paris convention priority to European patent application 17164263.0 the contents of which are incorporated herein by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. These challenges are also expected to be applicable to new generation wireless telecommunications systems, such as those implementing new Radio Access Technologies (RATs) such as $5^{th}$ generation (5G) or New Radio (NR).

SUMMARY OF THE DISCLOSURE

The present disclosure can help address or mitigate at least some of the issues discussed above.

Respective aspects and features of the present disclosure are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System and Relay Nodes

Figure 1:
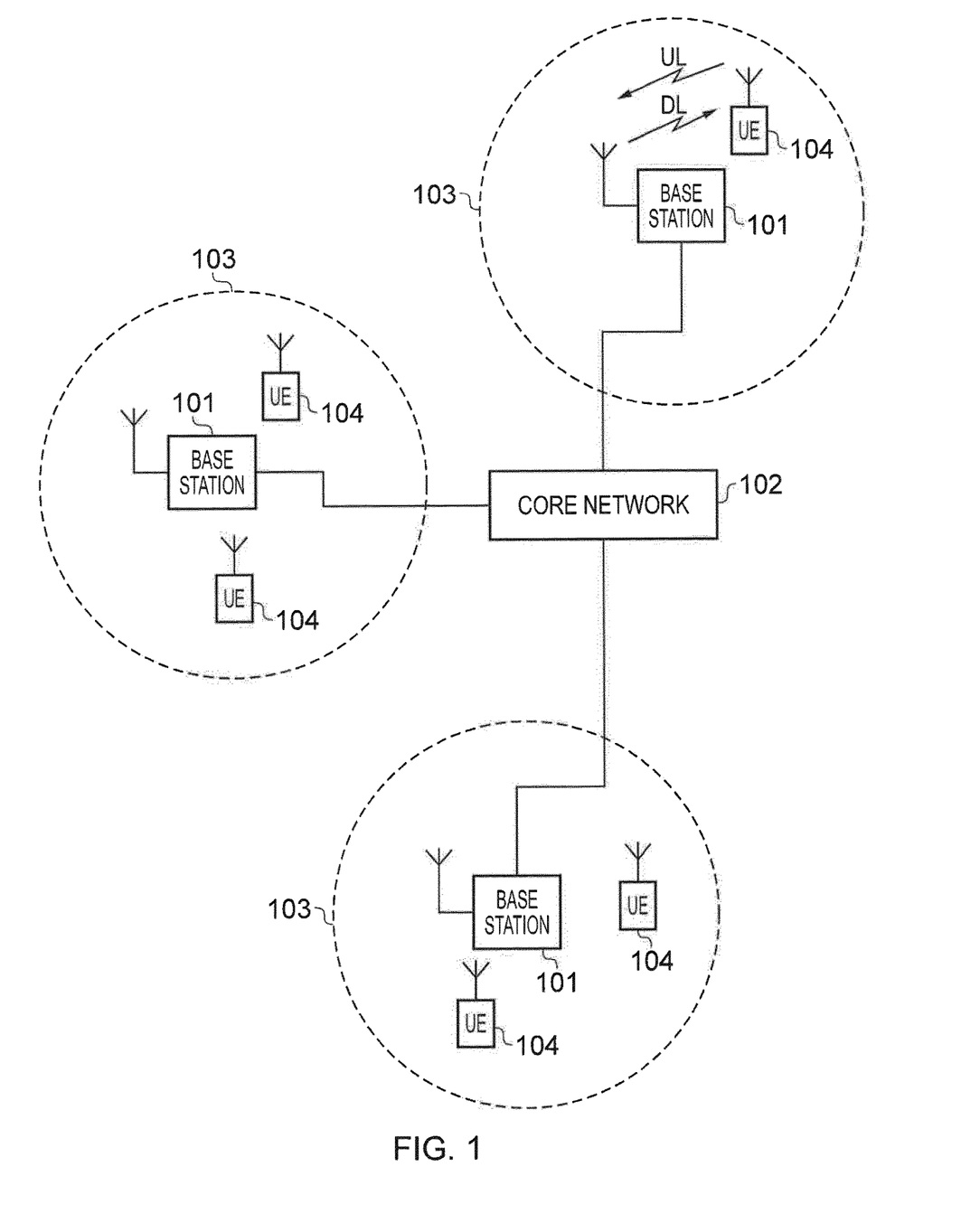
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short)/gNodeBs, and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced. Other benefits of using devices as relay nodes include better network resource utilisation, because a short device to device communication range means that resources can be re-used in different regions of a cell, a shorter range potentially means less retransmissions or repetitions of data, and because a shorter range means less interference due to a lower transmit power. Communication devices configured to act as relay nodes may also reduce signalling overhead, because for example mobility related signalling procedures may be performed by the relay node on behalf of remote UEs connected to the relay, rather than being performed by each individual device. The relay node functionality allows a remote device to be identifiable and addressable by the mobile network operator, allows operator control of quality of service, and provides end-to-end security, providing advantages over traditional tethering which is already possible for example by use of Bluetooth. The remote UE, that is the terminal that connects to the network through the relay device can also sometimes be referred to as UE, terminal, terminal devices, mobile device, D2D device, etc. and may be of any type suitable to use a relay device. Likewise, the relay device may be any suitable type of devices, such as a terminal or UE operating at least in part as a relay node, a dedicated relay node, infrastructure equipment (e.g. a base station) operating at least in part as a relay node and may be referred to as a relay device, relay, relay node, relay UE, etc. as appropriate.

Figure 2:
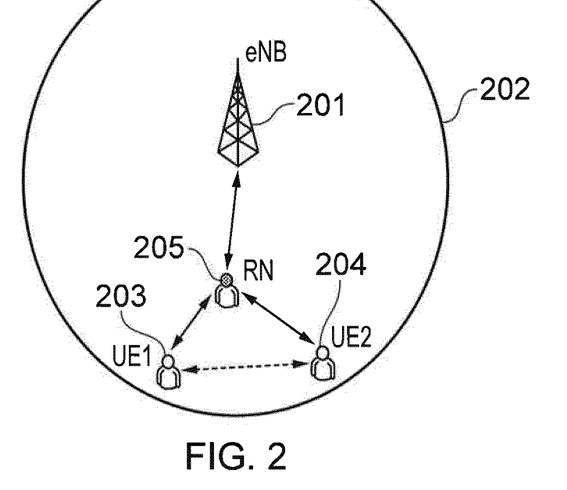
FIG. 2 illustrates an example of D2D communications using a relay node.

FIG. 2 illustrates an example network comprising an eNodeB 201 with a coverage area 202. Two UEs 203 and 204 may communicate with one another using device-to-device (D2D) communications. To communicate with the eNodeB 201, each of the UEs 203 and 204 communicate with a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

Relay technologies (such as a communication device configured to act as a relay) are known generally to provide an arrangement for receiving signals from a base station and for retransmitting the received signals to a UE in a mobile communications network, or to receive signals transmitted from a UE for re-transmission to a base station of a mobile communications network.

In other examples, the backhaul link may also be provided over a wired connection. Relay technologies are known generally to provide an arrangement for receiving signals from a base station and for retransmitting the received signals to a UE in a mobile communications network, or to receive signals transmitted from a UE for re-transmission to a base station of a mobile communications network.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilising for example the spectrum currently being used by GERAN systems as a replacement of one or more GSM carriers
2. 'Guard band operation' utilising the unused resource blocks within a LTE carrier's guard-band
3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Wearable devices (such as smartwatches and the like) are examples of devices which may make use of NB-IoT or LC-MTC communications systems. In 3GPP Rel. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes

One of the expected benefits of connecting indirectly to the network via a relay is that a remote device (e.g. a wearable device such as a smart watch) may be able to reduce its power consumption, since uplink transmissions can be performed at a much shorter range to the relay device, rather than to the eNodeB. One potential realisation of this would be to utilise a narrowband channel similar to eMTC or NB-IoT for the relay link. This would be suitable for sending (and also potentially receiving) small amounts of data via the relay. Another possibility would be to use Bluetooth or Wi-Fi for the relay link (sidelink).

Figure 3:
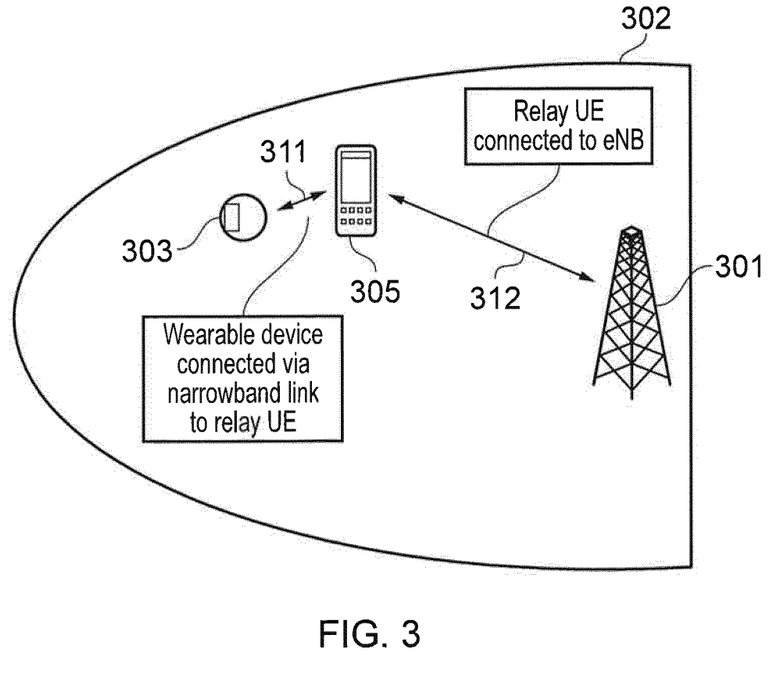
FIG. 3 illustrates an example scenario in which a remote wearable device may communicate with an eNodeB using a communications device as a relay node.

FIG. 3 illustrates an example scenario in which a remote wearable device 303 may communicate with an eNodeB 301 using a communications device 305 as a relay node. The eNodeB 301 has a coverage area 302, which the remote wearable device 303 and communications device 305 are within. The remote wearable device 303 is connected by a narrowband link 311 to the communications device 305, and the communications device is connected by a conventional link 312 to the eNodeB 301. The remote wearable device 303 may be, for example, a smartwatch, while the communications device 305 may be, for example a smartphone. The owner of the smartwatch may also own the smartphone, or alternatively, they may be owned by separate users.

As part of a 3GPP study item for Rel-15 [4], some of the concepts used in MTC and NB-IOT will be introduced for the D2D sidelink. Included in this is introduction of a limited bandwidth, for example 6 PRBs (Physical Resource Blocks)/1.4 MHz bandwidth sidelink similar to MTC. A UE with a limited receiver bandwidth (e.g. supporting LTE Cat-M) will also support a limited bandwidth for sidelink, in addition to direct link with the eNB.

As such it is not possible for this type of UE to monitor Uu (direct link) and PC5 (sidelink) simultaneously using the same receiver. In addition it is not possible to monitor more than 6 PRBs (in this example) on sidelink simultaneously.

In order to establish a PC5 connection between a remote UE 303 (e.g. limited bandwidth wearable device) and a relay UE 305 (e.g. Cat.1+ smartphone) the UEs must first perform a selection procedure and establish the PC5 connection. According to the current relay operation in Rel-13, the remote UE performs measurements on D2DSS (Device to Device Synchronisation Signal) transmitted by one or more relays, and once the criterion is met (e.g. RSRP (Reference Signal Received Power) or RSRQ (Reference Signal Received Quality) is above a threshold) then a relay may be selected, and a PC5 connection can be established to perform D2D (Device to Device) communication.

A radio resource pool is provided to the remote UE 303 to perform reception of various D2D signals. D2DSS, D2D discovery, and D2D sidelink data and control radio resource pools are provided. Due to the limited bandwidth of the remote UE 303, an efficient method for performing measurement, sync, discovery and communication is necessary.

Power Control in a Relay Node Arrangement

Currently, D2D transmissions are configured such that the remote terminal transmits all of its D2D transmissions at full power, that is, using a network configured (via broadcast signalling) maximum and constant power. This technical choice is supported by the historical design of D2D for safety and emergency services, and specifically for supporting devices out of network coverage via a relay. While this may be well adapted to safety applications, for other cases, such as commercial or wearables cases, such a use of the full transmission power can have a detrimental effect on the device's battery and on the level of interferences around the device, while providing potentially little or no benefit especially at short range.

However, current systems for controlling the transmission power to improve power consumption as well as reduce interference caused by transmitting devices relay on a close loop arrangement. For example, a closed loop power control technique is used to control the transmission power for LTE PUSCH transmissions. Such a technique requires frequent feedback from the receiver so that the transmitter can adjust the power of each transmission accordingly. While this approach has some benefit in a more conventional environment, it has limitations that can be more prominent in D2D situations. For example, a closed loop control system will involve a high level of resource and control signalling overhead in the reverse link which, when applied to a D2D situation, will also risk unduly draining the remote and relay device's battery.

In ReL-13, an eNodeB can configure power control parameters for D2D UEs. However, the configured transmission power is only for reducing interferences at the eNodeB's receiver. It is generally not an optimal configuration of the transmission power on the sidelink (PC5). In particular, the power might be higher than what may be considered as sufficient to achieve the designed signal to noise/interference ratio (SINR). Namely, only the path loss between a D2D UE and eNodeB can be taken into account and there is no consideration for monitoring the connection between the relay terminal and remote terminal, let alone how to control the transmission power for this link.

Figure 4:
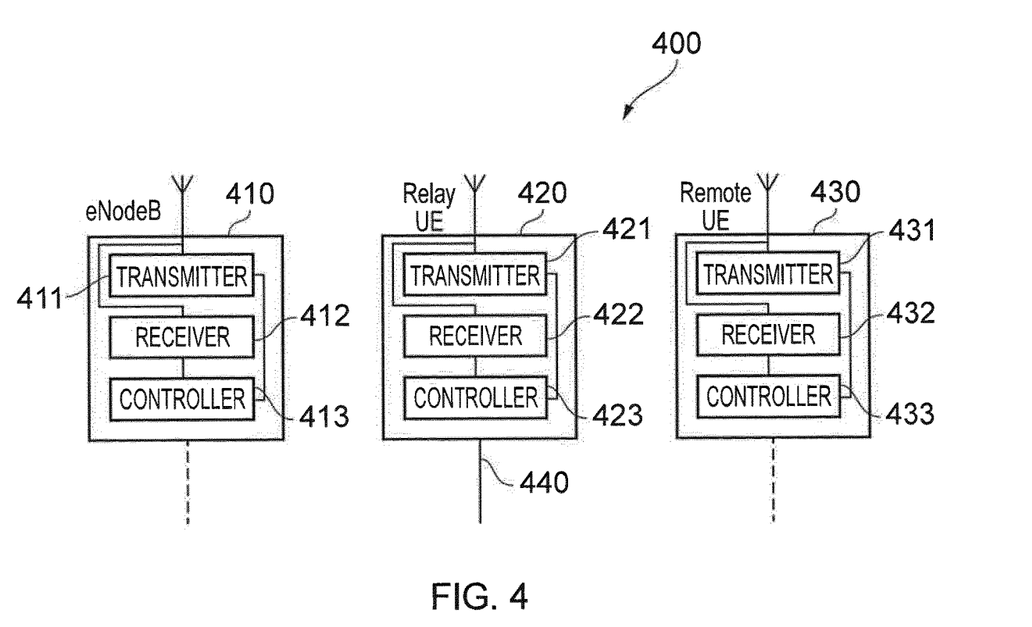
FIG. 4 is a schematic representation of a system comprising a relay node, a base station and a terminal device.

FIG. 4 is a schematic block diagram of a mobile communications system 400. The system comprises a relay device 420, one or more terminal devices 430 operating with a mobile communications network and infrastructure equipment 410 (e.g. base station) forming part of the mobile communications network. Each of the relay node 420, terminal devices 430 and infrastructure equipment 410 as shown in FIG. 4 comprise a transmitter (or transmitter circuitry) 421, 431, 411, a receiver (or receiver circuitry) 422, 432, 412 and a controller (or controller circuitry) 423, 433, 413 to control the transmitter 421, 431, 411 and receiver 422, 432, 412. Each of the 423, 433, 413 may be, for example, a microprocessor, a CPU, or a dedicated chipset, etc. It will be appreciated by those skilled in the art that, in arrangements of the present technique, the remote communications device/UE 430 may not always include a transmitter 431, for example in scenarios where the remote UE 430 is a low-power wearable device.

In accordance with an example of the present disclosure, the transmission power of the terminal device 430 for signals transmitted to the relay node 420 can be controlled using an open loop power control technique. Namely, the remote D2D can adjust its transmission power based on current circumstances but without constant feedback as required in a closed loop arrangement. For providing such an arrangement, it is proposed that the remote UE receives from the relay node an indication of a maximum transmission power that it can use and the remote UE can then decide which transmission power to actually use, so long as it does not exceed the maximum transmission power. Accordingly, the D2D transmitter can adjust its power setting without constant feedback and instructions from the network or relay.

The maximum transmission power communicated to the terminal can be set based on the D2D (PC5) link quality and/or on the Uu link quality. The terminal, i.e. the transmitting device whose power is being controlled, can set the actual power of its transmissions based on measurements of the received D2D signal. For example, the terminal can carry out an RSRP measurement or RSRP-like measurement on the SideLink Synchronisation Signals (SLSS) received from the relay. Accordingly, the terminal will be able to adjust its transmission power on a regular basis using measurements results while only limited instructions are received for the terminal, namely a maximum transmission power that the terminal can use. As it is expected that this maximum transmission power will effectively only be relatively infrequently updated, in particular compared to a closed loop arrangement, significant overhead saving may be achieved. This in turns translates into a reduce complexity, and battery consumption—compared to both a constant use of the full power and to a closed loop control mechanism—and to a reduced used of resources—compared to a closed loop mechanism, but also compared to a constant use of full power as will be clear from the discussion below.

Figure 5:
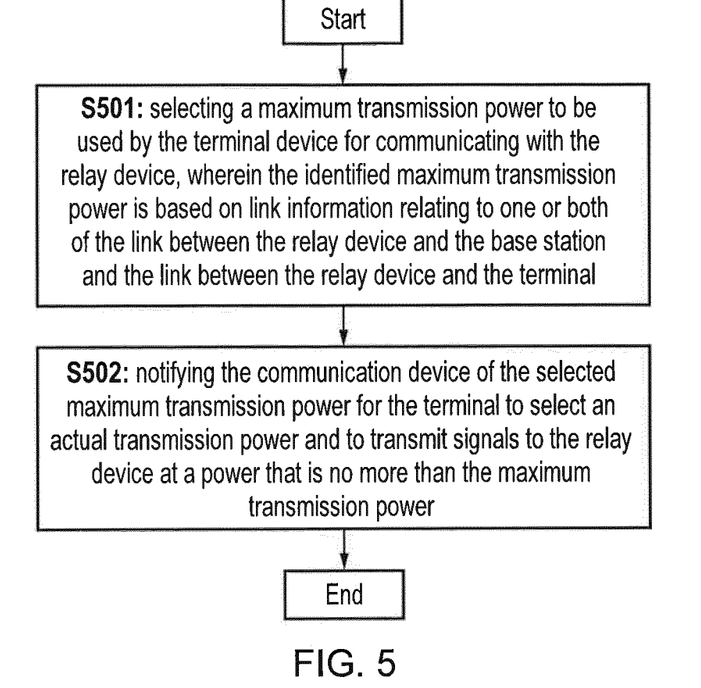
FIG. 5 shows a block diagram illustrating a method of operating a relay node in accordance with an example of the present disclosure.

FIG. 5 shows a block diagram illustrating a method of operating a relay node in accordance with an example of the present disclosure. First at S501, the relay node can select a maximum transmission power to be used by the terminal device for communicating with the relay device, wherein the identified maximum transmission power is based on link information relating to one or both of the link between the relay device and the base station and the link between the relay device and the terminal. Then at S502 the relay node can notify the communication device of the selected maximum transmission power. Accordingly, the terminal can select an actual transmission power that does not exceed this maximum and can transmit signals to the relay device at the actual transmission power.

In some examples, the relay node can select the maximum transmission power based on a distance or estimated distance between the relay and base station. For example, for longer distance between the two, the selected maximum transmission power can be the same or higher than a selected maximum transmission power for a shorter distance. In further examples, the distance can be estimated at least in part based on the link information relating to the link between the relay device and the base station. For example, the relay can use path loss (the difference between actual transmit power, and received or measured power) information to estimate a distance to the base station. In another example or in combination, a base station can calculate the timing advance (TA) between the relay and the base station based on a uU round trip propagation delay. The base station can convert the propagation delay to a distance with the speed of electromagnetic wave (light) and from this the distance between the relay and base station can be derived or estimated. As the skilled person will understand, the distance can be estimated based on a specific measurable distance (e.g. in m, km etc.), a pathloss (dB) or based on a category (e.g. "close", "medium" or "far" or in a category measured from 0 to N).

In another example, the relay node can select the maximum transmission power based on a distance or estimated distance between the relay and other relays. For example, if there are no other relays communicating near the relay terminal, the relay terminal and the terminal transmitting signals are less likely to cause interference with signals for other relay UEs and can thus use higher power settings. On the other hand, if there are other relays currently communicating near the relay terminal, the relay terminal can use a lower transmission power so as to limit the interference with the signals for the other relay terminals. In some examples, the calculation of the distance or estimated distance can be based on a path loss and/or TA information. To identify the other relays around the relay terminal, a discovery signal or SLSS signal may be used. If the relay terminal detects one or more other relay terminals need to be taken into consideration, the maximum transmission power for the D2D devices of the relay terminal can be set accordingly. For other relay terminals around relay terminal, it is also possible that they can calculate the interference level from the relay UE. If the interference level is higher than the threshold (e.g. provided by the base station or preconfigured), such a further relay terminal can transmit "interference indicator" to the base station and/or other relay terminals that they are suffering from interference from other devices. Based on this information, the base station can take appropriate actions to reduce interference such as changing resource pool to make them orthogonal or indicate interference source relay to reduce power or can instruct one or more of the active relay terminals to reduce the maximum transmission power parameter used for their D2D respective terminals. Furthermore, in some cases a base station may instruct one or more terminal device(s) communicating with an interference source relay to handover to another relay UE stop the operation of the interference source relay in order to help reduce interference in the system.

For example, a remote terminal using a higher transmission power at the edge of a cell is less likely to cause interference to regular uplink transmissions than when using the same transmission power close to the base station. Accordingly, by setting a maximum transmission power for the terminal based at least in part on an estimated distance between the relay and base station, the power control (taking into account the effect on the interference level) can be further enhanced.

Accordingly, the relay device can select a maximum transmission power based on at least one of (i) a received power, (ii) a carrier-to-noise and (iii) a signal-to-noise measurement for one of or more of the link between the relay device and the base station, the link between the relay device and the terminal, the link between the relay device and another other relay device, the link between the relay device and a remote device.

In another example, the relay device can select the maximum transmission power based on relay power information transmitted by the base station to the relay device. For example, the maximum transmission power can be set by the base station for the relay node based on the link between the base station and the relay node (and on the relay node and the terminal device if one or both devices have notified the base station accordingly) and based on any other information that the base station has available that can be helpful for setting this maximum. For example, the base station can use the following information either individually or in any possible combination: number of terminals connected to the base station, number of terminals connected to the relay, number of terminals present in the cell, location information for one or more terminals or relays, an interference level in the cell, uplink measurements at the eNB, closed loop power control information used for controlling the relay UE uplink power, etc.

Regarding the notification of the maximum transmission power to the terminal, it can be configured by the relay either explicitly or implicitly. For an implicit notification, it can for example be based on the SLSS transmission power from the Relay (namely the relay can indicate its transmission power so that the remote UE can calculate the path loss). The SLSS transmission power can then for example be used to set the maximum transmit power of the remote UE.

It is also noteworthy that, in addition to configuring the maximum transmission power allowed for the terminal, the relay node may transmit additional information for the open loop power control for remote UEs. For example, it can transmit the transmission power used by the relay UE (e.g. for the SLSS, PBCH) for the terminal to be able to calculate a path loss as discussed above. The estimated path loss can also be used to calculate the actual transmit power to be determined and used by the remote terminal, while the SLSS transmission power might be used for an implicit definition of the maximum power for the terminal. The relay may also communicate an interference level (e.g. RSRQ) of the PC5 (D2D) link at relay receiver. This information may be used for remote UE to set/calculate the optimal transmission power for example in an attempt to meet the Signal to Interference & Noise Ratio (SINR) at the receiver of the relay UE.

Figure 6:
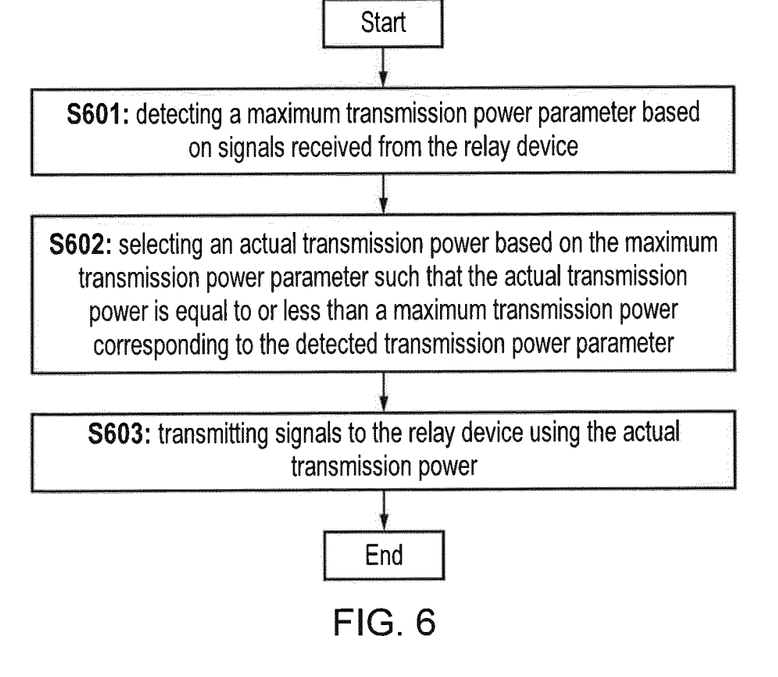
FIG. 6 shows a block diagram illustrating a method of operating a terminal device in accordance with an example of the present disclosure.

Now turning to the remote terminal, FIG. 6 shows a block diagram illustrating a method of operating a terminal device in accordance with an example of the present disclosure. At S601, the terminal can detect a maximum transmission power parameter based on signals received from the relay device. As discussed above, the maximum power may be explicitly or implicitly notified to the terminal, in some cases with additional information. Then at S602 the terminal can select an actual transmission power based on the maximum transmission power parameter such that the actual transmission power is equal to or less than a maximum transmission power corresponding to the detected transmission power parameter. Then at S603 the terminal can transmit signals to the relay device using the actual transmission power. In this manner, the terminal's transmission power can be controlled and effectively capped by the relay and/or network while the terminal can select, within the allowed power range, what it believes to be the most appropriate power setting to send signals to the relay.

In some cases, the setting of the actual transmission power may depend on one or more of: the degree of maximum transmission power such as the configuration of allowed maximum transmission power, the terminal capability depending on the maximum transmission power class and operation modes (e.g. close proximity). For example, for a high power terminal (such as one used for public safety), a higher level of interference to other relay terminals/terminals could be expected. Therefore, some moderate steps (e.g. ramp-up) of power increase within the allowed power range might be required to attempt to mitigate the risk of sudden and/or unexpected interference to other relay(s) or group UEs. Accordingly the terminal would gradually increase the power in an attempt to identify or to approach the highest actual transmission power that can still maintain an acceptable level of interference. On the other hand, for a low power terminal (such as one used for wearable devices), the risk of interference to other relay/group could be low and such a terminal may not use a "ramp-up" approach to identify a suitable actual transmission power. In some cases, a relay node may provide a setting indicating whether the "ramp-up" feature is enabled/disabled. This configuration could be on a per resource pool bases as a well-designed resource pool allocation among relays and terminal groups may help reducing this risk (e.g. Self-Organising Network "SON"). In other examples, a relay node may provide the indication of high interference to an interference source UE In some cases, when the remote terminal uses the maximum power or a transmission power that is closed to the maximum power, different actions may be taken (if any).

In one example, when the remote terminal is within a predetermined limit of the maximum transmission power, this can be reported to the base station, either directly or via the relay. For example a terminal device can, when the selected actual transmission power is equal to or within a predetermined range of the maximum transmission power, transmit a notification to the base station. In some examples, the base station can be notified by transmitting a notification directly to the base station and/or transmitting a notification to the base station via the relay device. While the report may originate from the remote device (e.g. reporting the RSRP measurement of the D2D link via the relay), in other cases it may additionally or alternatively originate from the relay (e.g. when the relay detects that the RSRP from the remote device is dropping to a low value, since the remote terminal has reached its maximum transmission power but it still moving away from the relay terminal).

Then the terminal can either (i) continue using the same power without exceeding the maximum, (ii) disconnect from the relay and connect to the base station, (iii) receive a new maximum power setting from the relay or network (for example due to a re-evaluation of the maximum power settings following the notification that the remote terminal is using a power setting close to or at the maximum power) and/or (iv) be allocated a different resource pool for its transmission (with the same or a different maximum transmission power setting.

As mentioned above, the maximum transmission power parameter can be detected using a variety of techniques, for example using one or more of: (i) a received power for signals received from the relay device, (ii) and estimated power for signals received from the relay device, (iii) an indicator received from the relay device and notifying the terminal device of the transmission power used by the relay device for said signals and (iv) maximum transmission power transmitted by the relay device to the terminal device.

Also, once the maximum power setting has been identified, the terminal can set the actual transmission power setting using different techniques. In some examples, the terminal can select the actual transmission power based on at least one of (i) a received power, (ii) a carrier-to-noise, (iii) a signal-to-noise and (iv) a path loss measurement for the link between the terminal device and the relay device.

In other words, a terminal device can carry out measurements of the link between the terminal device and the relay device and select the actual transmission power based on the measurements for the link between the terminal device and the relay device. In some examples, the terminal device can select the actual transmission power such that it is higher for cases where the link quality (for the link between the device and relay) is lower. Accordingly, the terminal can try to compensate for a low quality link with a high transmission power, while the maximum power setting ensures that the decisions made by the terminal in this respect do not expect a level that is considered undesirable by the relay and/or base station.

Also, if the terminal determines that even at the maximum transmission power it cannot transmit signals to the relay device with at least an expected quality level for the transmissions, it can then decide to release the connection with the relay device and attempt to set up a connection with the base station. If for example the terminal determined that to reach the desired link quality, it would have to transmit signals to the relay using a power that exceeds the maximum power as previously set, then it can decide not to use the relay and to rely on the base station instead.

This approach may be for example suitable for the type of wearable device that connects only via the same user's smartphone. For example, the smart watch may be configured to connect via the smartphone when in very close proximity (when the user carries/wears both devices on the body) and to otherwise connect directly to the base station as soon as it detects the range is increasing. This type of device could for example operate in two modes (1) in a "linked mobility" mode whereby the wearable connects via the relay and the devices move around together with a very short-distance D2D communication link or (2) in a "direct" mode whereby the device connects directly to the network.

In this case where the connection configurations between the two devices will not significantly change with time, the maximum power in this "linked mobility" mode may for example be a fixed value set as soon as the two devices connect, and may not require ongoing maintenance (e.g. thereby avoiding monitoring of the Uu link). The reselection from indirect to direct link to the base station may be performed automatically by the remote device (similar to cell reselection) or it may be performed more like a handover, whereby the remote device reports to the relay that it is going out of range (or the relay measurements determine the remote UE is going out of range) and the network issues a handover command to connect directly with the base station. This handover type procedure may for example be more suitable where service continuity is required, such as during a voice call, whereby the reselection approach may be more efficient when service continuity is not so essential, or when a short interruption is acceptable such as during small data transfer.

It is also noteworthy, that when a terminal is operating in close proximity to the relay (e.g. as discussed above), then the transmission power is expected to be low such that the allocation of resources can be adapted in view of the transmission power. For example, the terminal device may, when the selected actual transmission power is below a threshold, operate in a "close proximity" mode. In this mode, one or more terminal devices in the cell for the base station can share time and frequency resources for transmitting signals to their respective relay devices. While the remote terminal and the relay are in very close proximity the remote terminal may operate in use the resources reserved for very close proximity communications, for terminals transmitting with a low transmit power. D2D communications that are not in close proximity mode can use a different set of resources. Accordingly, by using different sets of resources, the low power/close proximity resources can be re-used in different parts of the cell, as well as for conventional uplink communications as different groups of terminals operating at this transmission power will not interfere with one another or to a limited extent only. Likewise, the interference with the Uu uplink transmissions from other terminals (especially those close to the centre of the cell) will be limited. In contrast, other resource pools may be reserved for higher transmission power for the case where interference may occur. Accordingly, by reducing the power and adapting the current link conditions, it can be possible to re-use resources in different areas of the same cell improving overall efficiency and capacity.

Figure 7:
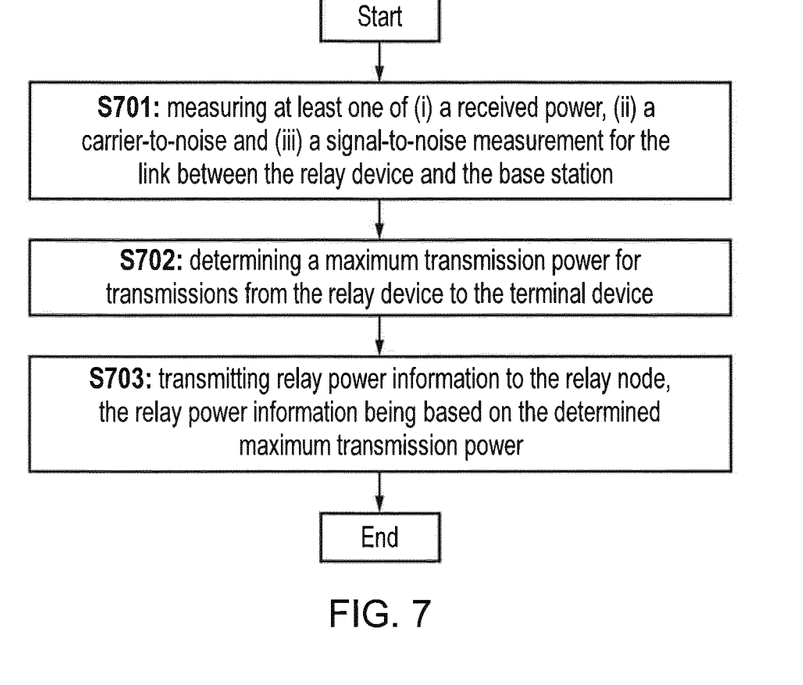
FIG. 7 shows a block diagram illustrating a method of operating a base station in accordance with an example of the present disclosure.

Now turning to the base station, FIG. 7 shows a block diagram illustrating a method of operating a base station in accordance with an example of the present disclosure. First at S701 the base station can measure at least one of (i) a received power, (ii) a carrier-to-noise and (iii) a signal-to-noise measurement for the link between the relay device and the base station. Then, based on the measurements, it can determine at S702 a maximum transmission power for transmissions from the relay device to the terminal device and transmit (S703) relay power information to the relay node, the relay power information being based on the determined maximum transmission power.

Figure 8:
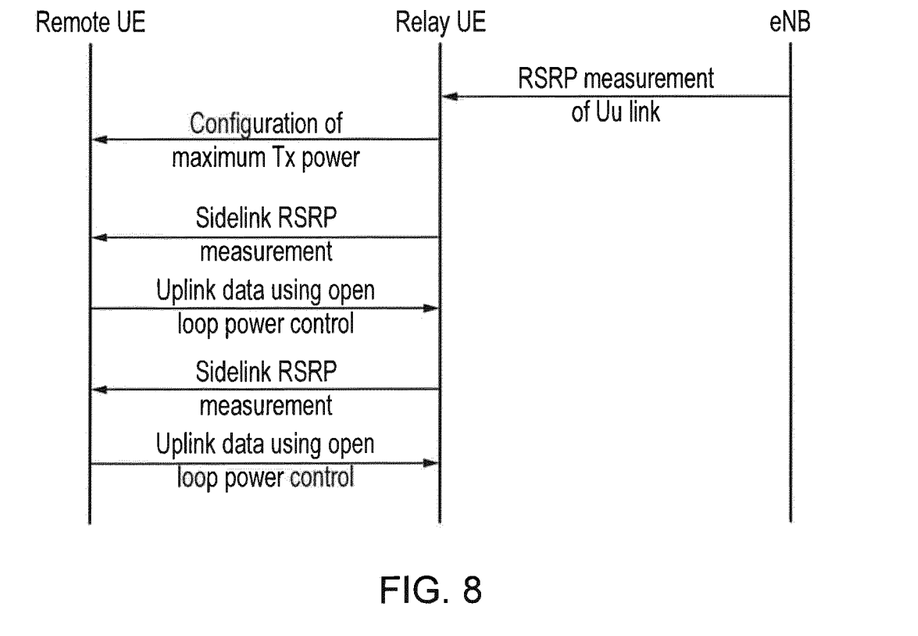
FIG. 8 shows a flow diagram in accordance with an example of the present disclosure.

FIG. 8 shows a flow diagram in accordance with an illustrative example of the present disclosure. In this example, the remote terminal is communicating with the network via a relay device and is monitoring only the D2D/PC5 link quality (in other example it might for example be monitoring the direct Uu link quality). The relay UE has a direct connection with the eNB and is performing radio link monitoring of this link. The relay can therefore determine the level of coverage within the cell, and can set a maximum transmit power to the remote UE on that basis. For example, a coverage indicating that the relay is at the centre of the cell may result in a lower maximum power setting and conversely, a coverage indicating that the relay is at the edge of the cell may result in a higher maximum power setting.

The remote terminal is notified of this maximum power and also performs measurements of the RSRP of the PC5 link. Based on the maximum power and on the measurements, it can then set its transmission power accordingly. As mentioned above, it is contemplated that a higher actual transmission power would be used for a lower RSRP and a lower actual transmission power for a higher RSRP. The remote terminal can therefore transmit at a lower power than the maximum power set (e.g. when in very close proximity to the relay node) while the maximum setting defines the maximum range of the D2D link between the relay and remote terminal.

In some cases the maximum power setting may not be maintained or may be maintained very infrequently. In some cases it may occur based on the measurement of the Uu link quality between the relay and base station such that a higher maximum transmit power is allowed when the relays and/or remote terminals are further from the cell centre and a lower maximum transmit power is set when they are closer to the cell centre as discussed above. It is noteworthy that this can also allow for better extension of coverage while the remote UE is out of coverage of the cell, for larger range of the relay link when near the cell edge, while limiting interferences with other terminals in the cell when closer to the cell centre (where it may be more efficient for the remote UE to connect directly with the network such that the remote UE would still be able to connect to the network). Allowing the remote UE to set its transmit power in an open loop fashion reduce the need for constant and frequent control feedback from the receiving device as provided in a closed loop technique, while allowing the maximum power to be set still allows some transmission power limitations that can be set depending on the situation.

Although the above described embodiments of the present technique deal primarily with the relaying of transmissions between an infrastructure equipment of a mobile communications network and a remote (communications) device, it should be clear to those reading that embodiments of the present technique may also the D2D relaying of signals between two communications devices.

Those skilled in the art would appreciate that some of the "predetermined" conditions, thresholds, numbers, types and the like may be set in the specifications and as such hardwired into the various mobile communications devices. Alternatively, some of these "predetermined" conditions, thresholds, numbers, types and the like may be determined by the mobile communications network, and transmitted (i.e. from the infrastructure equipment) to the remote and relay communications devices.

The power control mechanisms which are described in this document cannot be limited to the communication link on the connection between the terminal and relay is established. These techniques can be also applied in respect of the discovery link such that the different power control mechanisms discussed above generally in respect of communications can be applied for discovery signals from terminals. In some examples, for discovery specific power control, ramping up based power control can be used (as discussed above). For example, once the maximum transmission power is determined, the terminal can firstly transmit the discovery signal with X % of the maximum transmission power setting (with X<100) so that unexpected interference should be avoided. If the terminal cannot receive any response to the discovery message, the terminal can ramp up the transmission power, potentially up to the maximum transmission power that has been set and communicated (directly or indirectly) to the terminal. The ramping up level can be multiple and set as appropriate based on the circumstances.

In some cases, the terminal sending discovery messages can use an actual transmission power that is less than the set maximum transmission power based on factors as discussed above. Depending on the terminal's configuration it can then ramp up of the power as discussed above or only this actual transmission power. In some examples, the terminal may be configured to always use the set maximum transmission power by default for discovery message. The rationale can be that this maximum power is deemed acceptable by the relay and/or network in the present circumstances and that using the maximum allowable power could increase the likelihood of the discovery message being received. In some examples, the terminal could later, if appropriate, reduce the actual transmission power once the connection has been established.

The following numbered paragraphs provide further example aspects and features of the present technique:

Clause 1. A relay device in a mobile communications network, the relay device being configured to communicate with a terminal device of the network and with a base station of the network, the relay device comprising:
  transmitter circuitry configured to transmit signals to the terminal device and to transmit signals to the base station,
  receiver circuitry configured to receive signals from the terminal device and to receive signals from the base station, and controller circuitry configured in combination with at least the transmitter circuitry:
  to select a maximum transmission power to be used by the terminal device for communicating with the relay device, wherein the identified maximum transmission power is based on link information relating to one or both of the link between the relay device and the base station and the link between the relay device and the terminal;
  to notify the communication device of the selected maximum transmission power for the terminal to select an actual transmission power and to transmit signals to the relay device at a power that is no more than the maximum transmission power.

Clause 2. A relay device according to Clause 1 wherein the controller circuitry being configured to select a first maximum transmission power for a first estimated distance between the relay device and the base station that is equal to or higher than a second maximum transmission power for a second estimated distance between the relay device and the base station that is larger than or equal to the first estimated distance.

Clause 3. A relay device according to Clause 2 wherein controller circuitry is configured to estimate a distance between the relay device and the base station based on the link information relating to the link between the relay device and the base station.

Clause 4. A relay device according to any preceding Clause wherein the controller circuitry is configured to select a maximum transmission power based on at least one of (i) a received power, (ii) a carrier-to-noise and (iii) a signal-to-noise measurement for one of or both of the link between the relay device and the base station and the link between the relay device and the terminal.

Clause 5. A relay device according to any preceding Clause wherein the controller circuitry is configured to select the maximum transmission power based on relay power information transmitted by the base station to the relay device.

Clause 6. A terminal device in a mobile communications network, the terminal device being configured to communicate with a relay device of the network and with a base station of the network, the terminal device comprising:
  transmitter circuitry configured to transmit signals to the relay device and to transmit signals to the base station,
  receiver circuitry configured to receive signals from the relay device and to receive signals from the base station, and
controller circuitry configured in combination with the transmitter and the receiver circuitry:
to detect a maximum transmission power parameter based on signals received from the relay device;
to select an actual transmission power based on the maximum transmission power parameter such that the actual transmission power is equal to or less than a maximum transmission power corresponding to the detected transmission power parameter to transmit signals to the relay device using the actual transmission power.

Clause 7. A terminal device according to Clause 6 wherein the controller circuitry is configured to detect the maximum transmission power parameter based on one or more of: (i) a received power for signals received from the relay device, (ii) and estimated power for signals received from the relay device, (iii) an indicator received from the relay device and notifying the terminal device of the transmission power used by the relay device for said signals and (iv) maximum transmission power transmitted by the relay device to the terminal device.

Clause 8. A terminal device according to Clause 6 or 7 wherein the controller circuitry is configured to select the actual transmission power based on at least one of (i) a received power, (ii) a carrier-to-noise, (iii) a signal-to-noise and (iv) a path loss measurement for the link between the terminal device and the relay device.

Clause 9. A terminal device according to any one of Clauses 6 to 8 wherein the controller circuitry is configured:
to carry out measurements of the link between the terminal device and the relay device;
to select the actual transmission power based on the measurements for the link between the terminal device and the relay device.

Clause 10. A terminal device according to Clause 8 wherein the controller circuitry is configured to select the actual transmission power for first link measurements to be the higher than or equal to the actual transmission power for second link measurements when the first link measurements indicate a lower quality for the link between the terminal device and the relay device than for the second link measurements.

Clause 11. A terminal device according to any one of Clauses 6 to 10 wherein the controller circuitry is configured to, when the selected actual transmission power is equal to or within a predetermined range of the maximum transmission power, transmit a notification to the base station.

Clause 12. A terminal device according to Clause 11 wherein the controller circuitry is configured to notify the base station by one or more of: transmitting a notification directly to the base station and transmitting a notification to the base station via the relay device.

Clause 13. A terminal device according to any one of Clauses 6 to 12 wherein the controller circuitry is configured:
to determine that the maximum transmission power does not allow the terminal device to transmit signals to the relay device with at least an expected quality level for the transmissions;
to, upon said determination, release the connection with the relay device and attempt to set up a connection with the base station.

Clause 14. A terminal device according to any one of Clauses 6 to 13 wherein the controller circuitry is configured to, when one or both of the maximum transmission power and of the selected actual transmission power is below a threshold, to operate in a close proximity mode wherein, one or more terminal devices in the cell for the base station can share time and frequency resources for transmitting signals to their respective relay devices.

Clause 15. A base station in a mobile communications network, the base station being configured to communicate with a terminal device of the network and with a relay node of the network, the base station comprising:
  transmitter circuitry configured to transmit signals to the terminal device and to transmit signals to the relay node,
  receiver circuitry configured to receive signals from the terminal device and to receive signals from the relay node, and
controller circuitry configured in combination with at least the transmitter circuitry:
to measure at least one of (i) a received power, (ii) a carrier-to-noise and (iii) a signal-to-noise measurement for the link between the relay device and the base station;
to determine a maximum transmission power for transmissions from the relay device to the terminal device; and
to transmit relay power information to the relay node, the relay power information being based on the determined maximum transmission power.

Clause 16. A base station according to Clause 15 wherein the controller circuitry is configured:
to receive a notification from the terminal device that the terminal is using a transmission power that is equal to or within a predetermined range of the maximum transmission power; and
upon receipt of the notification, to instruct the terminal device to connect to the base station directly.

Clause 17. A base station according to Clause 15 or 16 wherein the controller circuitry is configured:
to receive a notification from the terminal device that the terminal is using a transmission power that is equal to or within a predetermined range of the maximum transmission power; and
upon receipt of the notification, to increase the determined maximum transmission power and to transmit updated relay power information to the relay node, the updated relay power information being based on the increased determined maximum transmission power.

Clause 18. A method of operating a relay device in a mobile communications network, the relay device being configured to communicate with a terminal device of the network and with a base station of the network, the method comprising:
  selecting a maximum transmission power to be used by the terminal device for communicating with the relay device, wherein the identified maximum transmission power is based on link information relating to one or both of the link between the relay device and the base station and the link between the relay device and the terminal; and
notifying the communication device of the selected maximum transmission power for the terminal to transmit signals to the relay device at a power that is no more than the maximum transmission power.

Clause 19. A method of operating a relay device configured in accordance with any one of Clauses 1 to 5.

Clause 20. A method of operating a terminal device in a mobile communications network, the terminal device being configured to communicate with a relay device of the network and with a base station of the network, the method comprising:
detecting a maximum transmission power parameter based on signals received from the relay device;
selecting an actual transmission power based on the maximum transmission power parameter such that the actual transmission power is equal to or less than a maximum transmission power corresponding to the detected transmission power parameter
transmitting signals to the relay device using the actual transmission power.

Clause 21. A method of operating a terminal device configured in accordance with any one of Clause 6 to 14.

Clause 22. A method of operating a base station in a mobile communications network, the base station being configured to communicate with a terminal device of the network and with a relay node of the network, the method comprising:
measuring at least one of (i) a received power, (ii) a carrier-to-noise and (iii) a signal-to-noise measurement for the link between the relay device and the base station;
determining a maximum transmission power for transmissions from the relay device to the terminal device; and
transmitting relay power information to the relay node, the relay power information being based on the determined maximum transmission power.

Clause 23. A method of operating a base station configured in accordance with any of Clauses 15 to 17.

Clause 24. Circuitry for a relay device in a mobile communications network, the relay device being configured to communicate with a terminal device of the network and with a base station of the network, the circuitry comprising:
  transmitter circuitry configured to transmit signals to the terminal device and to transmit signals to the base station,
  receiver circuitry configured to receive signals from the terminal device and to receive signals from the base station, and
controller circuitry configured in combination with at least the transmitter circuitry:

to a maximum transmission power to be used by the terminal device for communicating with the relay device, wherein the identified maximum transmission power is based on link information relating to one or both of the link between the relay device and the base station and the link between the relay device and the terminal;

to notify the communication device of the selected maximum transmission power for the terminal to transmit signals to the relay device at a power that is no more than the maximum transmission power.

Clause 25. Circuitry for a terminal device in a mobile communications network, the terminal device being configured to communicate with a relay device of the network and with a base station of the network, the circuitry comprising:

transmitter circuitry configured to transmit signals to the relay device and to transmit signals to the base station, receiver circuitry configured to receive signals from the relay device and to receive signals from the base station, and controller circuitry configured in combination with the transmitter and the receiver circuitry:

to detect a maximum transmission power parameter based on signals received from the relay device;

to select an actual transmission power based on the maximum transmission power parameter such that the actual transmission power is equal to or less than a maximum transmission power corresponding to the detected transmission power parameter to transmit signals to the relay device using the actual transmission power.

Clause 26. Circuitry for a base station in a mobile communications network, the base station being configured to communicate with a terminal device of the network and with a relay node of the network, the circuitry comprising:

transmitter circuitry configured to transmit signals to the terminal device and to transmit signals to the relay node, receiver circuitry configured to receive signals from the terminal device and to receive signals from the relay node, and controller circuitry configured in combination with at least the transmitter circuitry:

to measure at least one of (i) a received power, (ii) a carrier-to-noise and (iii) a signal-to-noise measurement for the link between the relay device and the base station;

to determine a maximum transmission power for transmissions from the relay device to the terminal device; and to transmit relay power information to the relay node, the relay power information being based on the determined maximum transmission power.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.
[4] RP-161839, "Revised SI: Further Enhancements LTE Device to Device, UE to Network Relays for IoT and Wearables," Huawei et al, RAN #73.
[5] S1-171438, "Relay selection criteria," InterDigital et al.
[6] S1-171439, "Relay selection criteria," InterDigital et al.
[7] TS 36.311, "Evolved Universal Terrestrial Radio Access (E-UTRA); Radio Resource Control (RRC); Protocol Specification," 3GPP.

What is claimed is:

1. A relay device in a mobile communications network, the relay device being configured to communicate with a terminal device of the network and with a base station of the network, the relay device comprising:

transmitter circuitry configured to transmit signals to the terminal device and to transmit signals to the base station, receiver circuitry configured to receive signals from the terminal device and to receive signals from the base station, and controller circuitry configured in combination with at least the transmitter circuitry:

to select a maximum transmission power to be used by the terminal device for communicating with the relay device, wherein the maximum transmission power is based on the link between the relay device and other relay devices; and to notify a communication device of the selected maximum transmission power for the terminal device to select an actual transmission power and to transmit signals to the relay device at a power that is no more than the maximum transmission power.

2. The relay device according to claim 1, wherein the controller circuitry is configured to select a first maximum transmission power for a first estimated distance between the relay device and the base station that is equal to or higher than a second maximum transmission power for a second estimated distance between the relay device and the base station that is larger than or equal to the first estimated distance.

3. The relay device according to claim 2, wherein the controller circuitry is configured to estimate a distance between the relay device and the base station based on the link information relating to the link between the relay device and the base station.

4. The relay device according to claim 1, wherein the controller circuitry is configured to select a maximum transmission power based on at least one of (i) a received power, (ii) a carrier-to-noise and (iii) a signal-to-noise measurement for one of or both of the link between the relay device and the base station and the link between the relay device and the terminal.

5. The relay device according to claim 1, wherein the maximum transmission power is based on link information relating to the link between the relay device and the base station.

6. A terminal device in a mobile communications network, the terminal device being configured to communicate with a relay device of the mobile communications network and with a base station of the network, the terminal device comprising:
  transmitter circuitry configured to transmit signals to the relay device and to transmit signals to the base station,
  receiver circuitry configured to receive signals from the relay device and to receive signals from the base station, and
  controller circuitry configured in combination with the transmitter and e receiver circuitry:
    to detect a maximum transmission power parameter based on signals received from the relay device, wherein the maximum transmission power is based on the link between the relay device and other relay devices;
    to select an actual transmission power based on the maximum transmission power parameter such that the actual transmission power is equal to or less than a maximum transmission power corresponding to the detected maximum transmission power parameter; and
    to transmit signals to the relay device using the actual transmission power.

7. The terminal device according to claim 6, wherein the controller circuitry is configured to detect the maximum transmission power parameter based on one or more of: (i) a received power for signals received from the relay device, (ii) and estimated power for signals received from the relay device, (iii) an indicator received from the relay device and notifying the terminal device of the transmission power used by the relay device for said signals and (iv) maximum transmission power transmitted by the relay device to the terminal device.

8. The terminal device according to claim 6, wherein the controller circuitry is configured to select the actual transmission power based on at least one of (i) a received power, (ii) a carrier-to-noise, (iii) a signal-to-noise and (iv) a path loss measurement for the link between the terminal device and the relay device.

9. The terminal device according to claim 8, wherein the controller circuitry is configured to select the actual transmission power for first link measurements to be the higher than or equal to the actual transmission power for second link measurements when the first link measurements indicate a lower quality for the link between the terminal device and the relay device than for the second link measurements.

10. The terminal device according to claim 6, wherein the controller circuitry is configured to, when the selected actual transmission power is equal to or within a predetermined range of the maximum transmission power, transmit a notification to the base station.

11. The terminal device according to claim 10, wherein the controller circuitry is configured to notify the base station by one or more of: transmitting a notification directly to the base station and transmitting a notification to the base station via the relay device.

12. The terminal device according to claim 6, wherein the controller circuitry is configured:
  to determine that the maximum transmission power does not allow the terminal device to transmit signals to the relay device with at least an expected quality level for transmissions; and
  to, upon said determination, release connection with the relay device and attempt to set up a connection with the base station.

13. The terminal device according to claim 6, wherein the controller circuitry is configured to, when one or both of the maximum transmission power and the selected actual transmission power is below a threshold, to operate in a close proximity mode wherein, one or more terminal devices in the cell for the base station can share time and frequency resources for transmitting signals to their respective relay devices.

14. A base station in a mobile communications network, the base station being configured to communicate with a terminal device of the network and with a relay node of the network, the base station comprising:
  transmitter circuitry configured to transmit signals to the terminal device and to transmit signals to the relay node,
  receiver circuitry configured to receive signals from the terminal device and to receive signals from the relay node, and
  controller circuitry configured in combination with at least the transmitter circuitry:
    to measure at least one of (i) a received power, (ii) a carrier-to-noise and (iii) signal-to-noise measurement for the link between the relay device and the base station;
    to determine a maximum transmission power for transmissions from the relay device to the terminal device, wherein the maximum transmission power is based on the link between the relay device and other relay devices; and
    to transmit relay power information to the relay node, the relay power information being based on the determined maximum transmission power.

15. The base station according to claim 14, wherein the controller circuitry is configured:
  to receive a notification from the terminal device that the terminal device is using a transmission power that is equal to or within a predetermined range of the maximum transmission power; and
  upon receipt of the notification, to instruct the terminal device to connect to the base station directly.

16. The base station according to claim 14, wherein the controller circuitry is configured:
  to receive a notification from the terminal device that the terminal device is using a transmission power that is equal to or within a predetermined range of the maximum transmission power; and upon receipt of the notification, to increase the determined maximum transmission power and to transmit updated relay power information to the relay node, the updated relay power information being based on the increased determined maximum transmission power.

\* \* \* \* \*